United States Patent
Hanka

(10) Patent No.: US 11,203,077 B2
(45) Date of Patent: Dec. 21, 2021

(54) APPARATUS FOR CONTROLLING AC WELD CURRENT BY MEANS OF AN ARC IGNITER

(71) Applicant: Gordon R. Hanka, Beaumont, TX (US)

(72) Inventor: Gordon R. Hanka, Beaumont, TX (US)

( * ) Notice: Subject to any disclaimer, the term of this patent is extended or adjusted under 35 U.S.C. 154(b) by 314 days.

(21) Appl. No.: 16/545,801

(22) Filed: Aug. 20, 2019

(65) Prior Publication Data

US 2021/0053134 A1 Feb. 25, 2021

(51) Int. Cl.
*B23K 9/067* (2006.01)
*B23K 9/073* (2006.01)

(52) U.S. Cl.
CPC .......... *B23K 9/0672* (2013.01); *B23K 9/0731* (2013.01); *B23K 9/0738* (2013.01)

(58) Field of Classification Search
CPC .. B23K 9/0672; B23K 9/0673; B23K 9/0731; B23K 9/0738; B23K 9/093
See application file for complete search history.

(56) References Cited

U.S. PATENT DOCUMENTS

| | | | | |
|---|---|---|---|---|
| 3,657,724 A * | 4/1972 | Feeley | ........... | B23K 9/091 |
| | | | | 219/130.51 |
| 5,278,390 A * | 1/1994 | Blankenship | ........ | B23K 9/0953 |
| | | | | 219/130.5 |
| 6,365,874 B1 * | 4/2002 | Stava | .......... | B23K 9/1062 |
| | | | | 219/130.33 |
| 6,847,008 B2 * | 1/2005 | Myers | ........... | B23K 9/0253 |
| | | | | 219/130.51 |
| 2014/0251971 A1 * | 9/2014 | Hearn | .......... | B23K 9/093 |
| | | | | 219/130.51 |
| 2015/0014290 A1 * | 1/2015 | Kooken | .......... | B23K 9/09 |
| | | | | 219/130.1 |
| 2016/0121418 A1 * | 5/2016 | Hanka | .......... | B23K 9/067 |
| | | | | 219/130.4 |
| 2016/0175961 A1 * | 6/2016 | Denis | .......... | B23K 9/067 |
| | | | | 219/130.4 |
| 2016/0368076 A1 * | 12/2016 | Ide | ........... | B23K 9/125 |

* cited by examiner

*Primary Examiner* — Ryan A Reis

(57) ABSTRACT

My invention is an improvement to a welding arc igniter. My invention periodically disables the arc igniter for one or more AC half-cycles.
When the igniter skips an AC half-cycle, the welding arc may not ignite, so average weld heat is reduced.
AC weld heat can be adjusted in real time, by varying the fraction of AC half-cycles that are skipped.
AC polarity balance can be adjusted in real time, by preferentially skipping the electrode-positive or electrode-negative half-cycles.

4 Claims, 2 Drawing Sheets

APPARATUS FOR CONTROLLING AC WELD CURRENT BY MEANS OF AN ARC IGNITER

FIELD OF THE INVENTION

My invention relates to arc welding, particularly to devices which help ignite a welding arc.

BACKGROUND OF THE INVENTION

Figure 1:
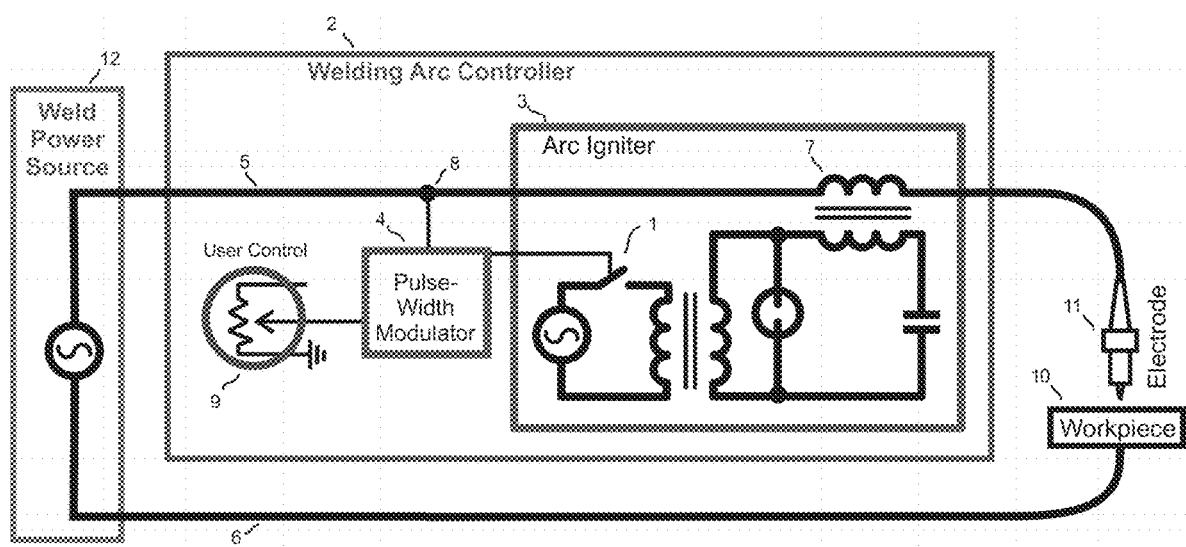
FIG. 1 depicts my invention, embedded in a typical arrangement of arc welder and arc igniter.

My invention is concerned with arc welding, especially arc welding with sinusoidal AC at frequencies of 60 Hz or less.

Arc-welding machines are often equipped with arc igniters.

Arc igniters augment the weld voltage with high-voltage pulses that briefly raise the open-circuit weld voltage to at least 500 volts. Said high-voltage pulses may be generated by capacitive discharge, inductive spike, or (most commonly) by magnetic induction, typically via a Tesla coil.

Prior-art arc igniters typically include an on-off control. They may also include a timer to limit firing time, and/or a sensor to detect weld voltage. When said on-off control is moved to the On position, said igniter fires until said timer expires, or until said arc igniter overheats, or until peak weld voltage falls below a threshold of approximately 50V, indicating successful arc ignition.

Prior-art arc igniters may include an intensity control to change the amplitude of said high-voltage pulses, and/or change the number of said high-voltage pulses per AC half-cycle, in order to reduce electromagnetic interference.

For example, most arc igniters are based on a Tesla coil, and control the spark intensity via a rheostat in series with the first-stage transformer primary, or by changing the width of the spark gap.

A Tesla coil is a type of two-stage transformer, used primarily for welding-arc ignition and entertainment.

In the prior art, Tesla coils used for entertainment have been controlled by pulse-width modulators, similar to my invention, but designed to produce music.

In Tesla coils used for welding-arc ignition, the second-stage transformer typically operates in a non-resonant mode, has fewer than 50 secondary windings of high current capacity (at least 6 AWG copper wire equivalent) and produces peak output voltage of 25 KV or less.

By contrast, in Tesla coils used for other purposes, the second-stage transformer typically operates in a resonant mode, with more than 200 secondary windings of low current capacity (less than 12 AWG copper wire equivalent) and produces peak output voltages greater than 100 KV.

Detailed procedures for measuring arc igniter current capacity and peak output voltage are presented in IEC 60974.3, the technical standard for Arc Igniters sold in the European Union.

Arc igniters are particularly important for the TIG (Tungsten-Inert-Gas) welding process.

TIG welding is often performed with sinusoidal AC, wherein weld voltage falls to zero between AC half-cycles, so the arc extinguishes. When the voltage rises (I.e., the next AC half-cycle) the arc may not reignite. This problem is particularly severe at 50-60 Hertz, the most common AC arc-welding frequencies. Hence, AC TIG welding may require a "continuous-fire" arc igniter, to re-ignite the arc at the beginning of every AC half-cycle.

In some welding tasks, particularly when welding aluminum, the weld heat (that is, the average power of the welding arc) must be reduced during the weld, as the work piece (the item being welded) heats up. In other words, as the work piece gets hotter, weld heat must be reduced to avoid over-penetration.

Prior-art mechanisms for mid-weld adjustment of weld heat are not trivial, and are found only in high-cost welding machines. No weld heat controls are found in prior-art arc igniters.

When welding with AC, it may also be useful to adjust polarity balance.

AC weld voltage is a series of half-cycles of alternating polarities: Electrode-positive, then electrode-negative, then back to electrode positive, repeating continuously.

The two polarities serve different purposes. The electrode-positive half-cycles provide "cleaning." That is, they help strip away surface oxidation and expose clean metal. However they tend to overheat the electrode.

The electrode-negative half-cycles give less cleaning power, but better penetration with less heat damage to the electrode.

Low-cost welders supply "balanced" AC. That is, the weld power is divided evenly between the electrode-negative and electrode-positive half-cycles.

However, some welding tasks require unbalanced AC. For example, some tasks require only a small amount of cleaning action (I.e., only a small amount of electrode-positive weld power.) In this case, balanced AC will supply more cleaning action than is needed, which will tend to overheat the electrode.

Thus, a user may wish to adjust the polarity balance. That is, a user may wish to increase the average power of electrode-negative half-cycles, while reducing the average power of electrode-positive half-cycles, or vice versa.

Prior-art mechanisms for adjusting polarity balance are not trivial, and are found only in high-cost welding machines. No polarity controls are found in prior-art arc igniters.

My invention enables the arc igniter with a PWM (Pulse-Width Modulator.)

PWM's are common devices that convert an input value into a train of digital voltage pulses of variable length and spacing. The pattern of pulse length and spacing will be called the pulse schedule.

Commonly, said pulse schedule is controllable via an external voltage, an external resistance, or a digital signal.

Said pulse schedule is often characterized by a clock: a notional, fixed-frequency square wave. Said square wave is notional because it may not exist in any physical form. The rising edge of said notional square wave marks the beginning of the clock cycle. In each said clock cycle, said pulse schedule specifies the length of the output pulse.

Some PWM's are externally clocked. When a PWM is externally clocked, said clock cycles are forced to coincide with pulses in an external signal.

PWM's are commonly implemented via resistor-capacitor oscillators, digital oscillators, or in software.

PWM's are available off the shelf as prepackaged units, or as public-domain software routines, or as components of other devices such as electric motor speed controls or general-purpose computers.

Some PWM's are implemented in digital logic, with a fixed pulse length. The pulse schedule denotes each clock cycle as On or Off, and variable-length pulses are generated by stringing together multiple fixed-length pulses.

A pulse schedule may be stored in a lookup table, or computed on the fly by algorithm, or embodied in a hardware timing circuit.

The simplest pulse schedule specifies a fixed pulse width and separation, chosen to achieve a specified clock period and duty cycle.

In a more complex pulse schedule, the specified duty cycle is produced with variable pulse widths and/or variable pulse separations. Said variable pulse widths and/or separations are commonly used to increase duty-cycle resolution (I.e., to increase the number of possible duty cycles) in digital PWM's wherein the allowable pulse widths are discrete. For example, a 22% duty cycle might be achieved with the following 9-step pulse schedule: 100010000.

A more sophisticated pulse schedule can produce different duty cycles for the odd- and even-numbered clock cycles.

Some PWM's store multiple pulse schedules in a lookup table. One example is a serial binary encoder.

A low-frequency pulse schedule can be produced with a clock of arbitrarily high frequency, simply by stringing short pulses together into long pulses. Therefore it is often convenient to characterize a pulse schedule relative to a hypothetical clock of lower frequency than the PWM's actual internal clock.

DESCRIPTION OF THE INVENTION

My invention is to switch the arc igniter on and off with a PWM (Pulse-Width Modulator) with a pulse schedule selectable in real time by the user.

For purposes of my invention, it will be convenient to characterize said pulse schedule via an ignition schedule. The ignition schedule is a way to summarize said pulse schedule, but is not necessarily a concrete feature of said PWM.

Said ignition schedule describes the PWM output relative to the half-cycles of AC weld voltage, regardless of whether said PWM output is actually synchronized with said AC weld voltage.

When said AC weld voltage is not present, my invention is not useful and it's operation is not defined.

Said ignition schedule specifies which of the AC weld-voltage half-cycles are ignited, and which are not, either by an explicit schedule, or by one or more statistical summary measures.

Said AC weld-voltage half-cycle is considered ignited if one or more pulses enable said arc igniter during the effective ignition period.

Said arc igniter is considered enabled if it raises the absolute weld voltage above 500 volts.

Said effective ignition period is the first three-fourths of said AC weld-voltage half-cycle, beginning at the zero crossing.

Figure 2:
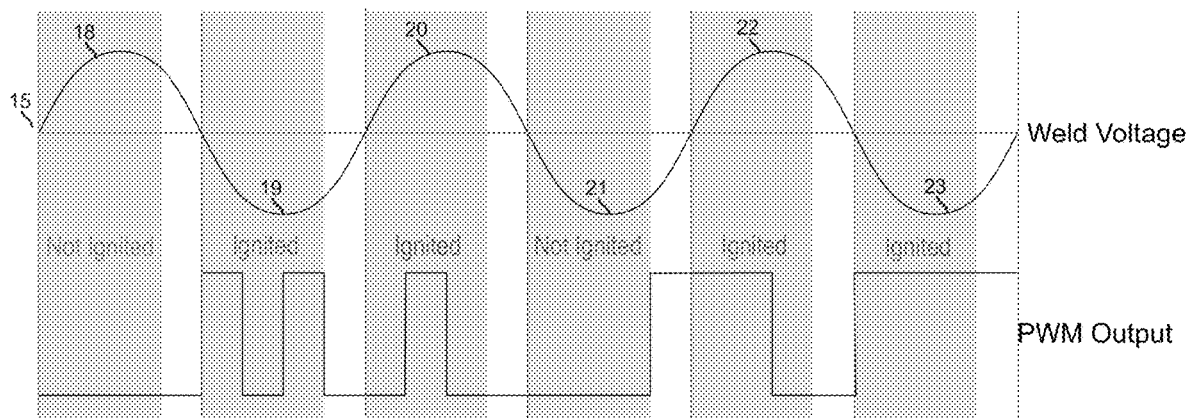
FIG. 2 shows examples of AC weld-voltage half-cycles that are ignited or not ignited, depending on the output of a hypothetical pulse-width modulator.

FIG. 2 shows several examples of AC half-cycles that are either ignited or not ignited. Effective ignitions periods are marked with shaded rectangles.

Ignition duty cycle is defined as the fraction of said AC weld-voltage half-cycles that are ignited. Said ignition duty cycle is a statistical summary measure, not necessarily a precise description of any particular set of pulses.

In one embodiment, my invention reduces AC weld heat by reducing said ignition duty cycle, thereby skipping some AC half-cycles. When the arc igniter skips a half-cycle, the arc might not ignite, so average weld heat is reduced.

In this embodiment, the user specifies the desired ignition duty cycle via the user control.

In another embodiment, my invention controls AC polarity balance. In this embodiment, the ignition schedule preferentially skips electrode-positive and electrode-negative half-cycles. The user specifies the desired polarity balance via the user control, which then determines the proportion of electrode-positive cycles to be skipped.

For example, a 60-40 polarity balance can be implemented with the following twelve-step ignition schedule: 111011111011.

On some AC half-cycles, the welding arc may self-ignite, even if the arc igniter does not fire. Optionally, arc self-ignition can be detected by the PWM, and the ignition schedule adjusted to compensate. In the simplest embodiment, when the welding arc self-ignites for one half-cycle, the PWM will skip the next scheduled igniter firing of the same polarity. Arc self-ignition can be detected by a magnetic current sensor, or inferred when the peak weld voltage drops below a pre-specified threshold, typically 50 volts.

A disadvantage of my invention is that it cannot control DC weld current, because the arc will not reliably self-extinguish.

Another disadvantage of my invention is that it cannot control AC in excess of roughly 70 volts RMS, because the arc will self-ignite.

Another disadvantage of my invention is that it cannot control polarity balance without reducing weld heat.

The PWM of my invention can be purchased off the shelf or manufactured in numerous forms, as will be obvious to anyone with ordinary skill in pulse-width modulation.

Said user control could be a digital position encoder, a capacitive position sensor, or any other device capable of selecting between at least three ignition schedules. In the preferred embodiment, the user control is just a pair of screw terminals, intended for the user to connect his own potentiometer. Numerous potentiometer-controlled PWM's are available off the shelf, or as public-domain circuit designs.

DETAILED DESCRIPTION

FIG. 1 shows one embodiment of my invention, in a typical TIG welding rig.

In FIG. 1, power paths are shown with thick lines, while signal paths are shown with thin lines.

Welding Arc Controller 2 is my invention, comprising Arc Igniter 3, PWM (Pulse Width Modulator) 4, User Control 9, and optional Sensor 8.

Arc Igniter 3 is depicted as a Tesla coil, but is meant to encompass any system for igniting a welding arc, including systems controlled by additional PWM's.

If Arc Igniter 3 is a Tesla coil, Secondary Winding 7 has a current capacity of at least 100 amps at 20% duty, as defined in IEC 60976-3:2019.

Arc Igniter 3's peak output voltage is 100 KV or less, as defined in IEC 60974-3:2019.

User Control 9 is depicted as a potentiometer, but is meant to encompass any control or control connector. In the preferred embodiment, User Control 9 is a pair of screw terminals for connection to a user-supplied potentiometer.

In the preferred embodiment, PWM 4 is clocked by AC weld voltage through optional Sensor 8. Alternatively, PWM 4 can be clocked by any external signal that is synchronous with weld voltage (E.g., mains voltage.)

Optional Sensor 8 senses voltage and/or current, by means obvious to anyone with ordinary skill in electronic design.

Weld Power Source 12 supplies weld current, which is transmitted to Electrode 11 and Work Piece 10 by means of Weld Cables 5, 6.

PWM 4 enables Arc Igniter 3 by closing Switch 1. In the preferred embodiment, Switch 1 will be a solid-state relay. (I.e., a bi-directional transistor switch.) However Switch 1 could be any switch, or a location in computer memory that enables Arc Igniter 3.

PWM 4 may be part of a computer that performs other functions.

Not shown are various auxiliary systems such as power supplies, noise filters, pull-up resistors, and input/output level shifters, as will be obvious to anyone with ordinary skill in electronic design.

PWM 4 is configured to produce at least three different ignition schedules.

In operation, the user sets User Control 9, which specifies said ignition schedule of PWM 4.

Said ignition schedule may be specified by a statistical measure. For example, said ignition schedule may be specified by an ignition duty cycle, where said ignition duty cycle is the fraction of AC half-cycles to be ignited.

PWM 4 outputs a train of digital pulses, such that some AC half-cycles are ignited but not others, as specified by said ignition schedule.

Said AC half-cycle is considered ignited when Arc Igniter 3 is enabled during the effective ignition period.

Arc Igniter 3 is considered enabled if it raises absolute weld voltage above 500 volts.

Said AC half-cycle is the time between the periodic zero crossings of the AC weld voltage in Cable 5.

Said effective ignition period is the first three fourths of said AC half-cycle.

When no AC weld voltage is present in Cable 5, the operation of my invention is not defined.

FIG. 2 shows the relation between AC weld voltage, effective ignition periods, and a hypothetical PWM Output.

In FIG. 2, the effective ignition periods are shown as shaded rectangles.

In FIG. 2, the AC weld-voltage half-cycles are numbered 18-23.

Half-cycle 18 is not ignited, because Arc Igniter 3 is not enabled.

Half-cycle 19 is ignited, because Arc Igniter 3 is enabled twice.

Half-cycle 20 is ignited, because Arc Igniter 3 is enabled once.

Half-cycle 21 is not ignited, because Arc Igniter 3 is enabled too late.

Half-cycle 22 is ignited, because Arc Igniter 3 remains enabled.

Half-cycle 23 is ignited, because Arc Igniter 3 remains enabled throughout.

In one embodiment, weld heat can be controlled by programming PWM 4 with the following example weld-heat algorithm:

```
1. Read duty_cycle from User Control 9;
2. Normalize duty_cycle to range 0-10;
3. Round duty_cycle to nearest integer;
4. on_time = duty_cycle * 16;
5. (Optional) Read weld_voltage from Sensor 8
   until weld_voltage > 30;
6. Reset millisecond_timer;
7. if (on_time > 0) enable Arc Igniter 3;
8. Wait until millisecond_timer >= on time;
9. if (duty_cycle < 1) disable Arc Igniter 3;
10. Wait until millisecond_timer >= 160;
11. Go to Step 1;
```

With 60-Hz AC weld current, and User Control 9 set to 20%, said example weld-heat algorithm fires Arc Igniter 3 for two consecutive cycles out of every ten. That is, the ignition schedule is 1100000000, which delivers 20% of the available weld power, evenly divided between electrode-negative and electrode-positive polarity. When the user control is set to 50%, Arc Igniter 3 fires on five consecutive cycles out of every ten, (I.e., ignition schedule 1111100000) delivering half the available weld power. When the user control is set to 100%, Arc Igniter 3 fires continuously, delivering all available weld power.

In said example weld-heat algorithm, optional Step 5 synchronizes said ignition schedule with the AC weld voltage. Without Step 5, PWM 4 will operate with a clock period of 16 milliseconds, slightly less than two 60-Hz AC half cycles, so it will drift in and out of sync with 60-Hz AC weld voltage, giving somewhat less steady heat control.

An ignition schedule can be embodied in a physical timing circuit, or computed by algorithm as in said example heat-control algorithm, or stored in a lookup table.

For example, PWM 3 can be programmed with an arbitrary 10-step ignition schedule via the following example lookup-table algorithm:

```
1. Declare ignition_schedule as Boolean array [10, 10];
2. Read ignition_schedule from permanent memory;
3. half_cycle_ptr = 1;
4. (Optional) Read weld_voltage from Sensor 8 until
   weld_voltage > 30;
5. Reset millisecond_timer;
6. Read duty_cycle from User Control 9;
7. Normalize duty_cycle to range 1-10;
8. If (ignition_schedule[half_cycle_ptr, duty_cycle])
   enable Arc Igniter 3
9. Wait until millisecond_timer >= 8;
10. Disable Arc Igniter 3;
11. Increment half_cycle_ptr;
12. If (half_cycle_ptr > 10) half_cycle_ptr = 1;
13. Go to Step 4;
```

Said ignition schedule may vary periodically. For example, a 44% ignition duty cycle could be implemented with the following 9-step ignition schedule: 101001010.

Said ignition schedule can vary randomly. For example, weld heat can be controlled by programming PWM 3 with the following stochastic heat-control algorithm:

```
1. (Optional) Read weld_voltage from Sensor 8 until
   weld_voltage > 30;
2. Reset millisecond_timer;
3. Read duty_cycle from User Control 9;
4. Normalize duty_cycle to range 0-1;
5. Generate random_number in the range 0-1;
6. if (random_number < duty_cycle) enable Arc Igniter 3;
7. Wait until millisecond_timer >= 16;
```

8. Disable Arc Igniter 3;
9. Go to Step 1;

I claim:

1. A welding arc controller, comprising an arc igniter, a pulse-width modulator, and a user control; wherein said arc igniter generates an absolute peak voltage of at least 500 volts but less than 100,000 volts in a weld-current conductor of at least 100 amps capacity; said amps capacity and peak voltage are measured at 20% duty cycle; said arc igniter is enabled by said pulse-width modulator; said pulse-width modulator is configured to ignite some AC weld-current half-cycles but not others, according to an ignition schedule; said AC half-cycle is considered ignited when said arc igniter is enabled during an effective ignition period; said arc igniter is considered enabled if it raises absolute weld voltage above 500 volts; said AC half-cycle is the time between the periodic zero crossings of the AC weld voltage; said effective ignition period is the first three fourths of said AC half-cycle; said pulse-width modulator is configured to produce at least three ignition schedules; said ignition schedule may be specified directly or by one or more statistical summary measures; said ignition schedule is selected by said user control.

2. The invention of claim 1, wherein said arc igniter is a Tesla coil.

3. The invention of claim 1, wherein said pulse-width modulator is clocked by said AC weld voltage, or by another signal that is synchronous with said AC weld voltage.

4. The invention of claim 2, wherein said pulse-width modulator is clocked by said AC weld voltage, or by another signal that is synchronous with said AC weld voltage.

* * * * *